Patented May 6, 1941

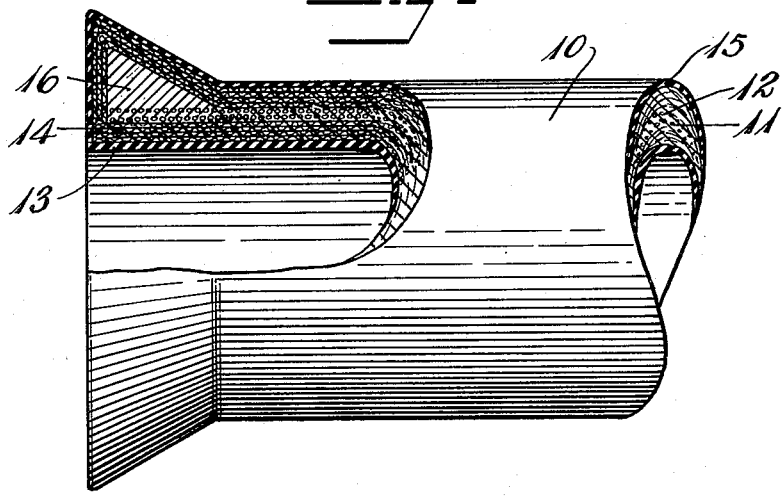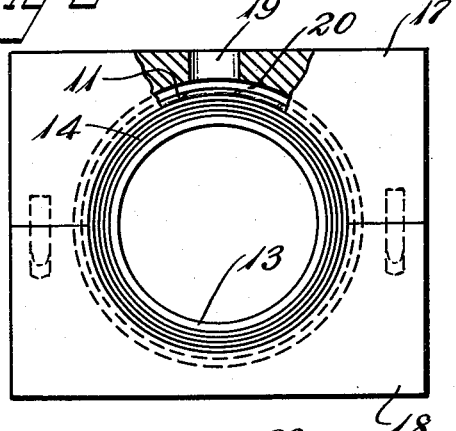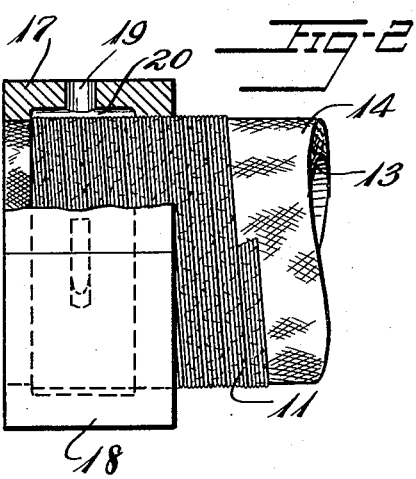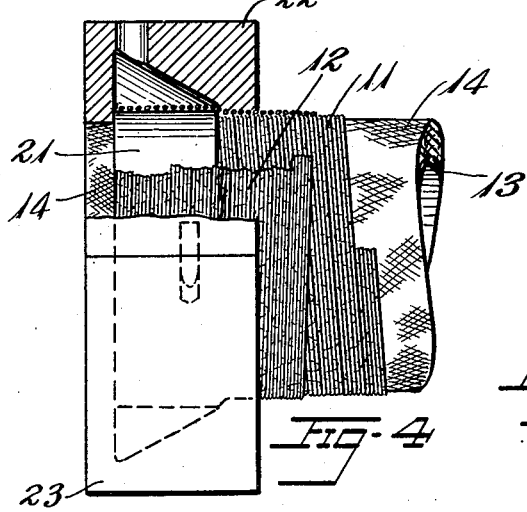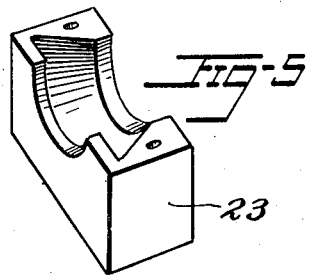

2,241,355

UNITED STATES PATENT OFFICE 2,241,355

HOSE AND METHOD OF MAKING THE SAME

Andrew D. Maclachlan, Akron, Ohio, assignor to The B. F. Goodrich Company, New York, N. Y., a corporation of New York Application January 7, 1939, Serial No. 249,768

7 Claims. (Cl. 154—8)

This invention relates to hose and to the method of making the same and is useful especially in hose for heavy duty, subject to strong suction or pressure, or both.

It has been common practice heretofore to attach couplings by clamping the hose between coupling members disposed at the inside and outside surface of the hose, but this has not been fully satisfactory in all cases, especially where abrasive fluids are conducted, because the inside clamping member has restricted the bore of the hose, and has been subject to excessive wear from the fluid. The elimination of the coupling member at the bore of the hose avoids this difficulty, but leaves the problem of providing an adequate anchorage of the coupling to the hose wall, which is important especially in hose for heavy duty.

The principal objects of the invention are to provide an improved anchorage of coupling to hose, to provide an improved coupling structure integral with the hose, to avoid restriction of the hose bore, to provide for anchoring the coupling directly to metallic reinforcing elements of the hose wall, to avoid objectionable localizing of stresses, and to facilitate manufacturing and assembling operations.

These and other objects will appear from the following description and the accompanying drawing.

Of the drawing:

Fig. 1 is a side elevation, partly broken away and shown in section, of the end of a hose constructed according to and embodying the invention.

Fig. 2 is a side elevation, partly broken away and partly shown in section, of a mold assembled about a hose end for casting a bonding means.

Fig. 3 is an end view of the assembly of Fig. 2, partly broken away and partly in section.

Fig. 4 is a view similar to Fig. 2 showing a mold for casting the finished reinforcement of Fig. 1.

Fig. 5 is a perspective view of one of the mold halves of Fig. 4.

Referring to the drawing, the numeral 10 designates a portion of a length of flexible hose. The hose wall may be of any suitable construction having one or more plies of flexible metallic reinforcements. In the hose illustrated, the numerals 11, 12 designate layers of metallic reinforcing wires in the form preferably of crossed layers of helically disposed tapes of braided or woven wires. The hose illustrated also has a lining 13 of rubber composition, plies of fabric 14 for strengthening the hose, and an outer protective layer 15 of rubber composition.

To provide for anchoring the ends of the woven wire tapes, metallic mesh tapes or other flexible metallic reinforcements, a ring 16 of metal, preferably of relatively low melting point, is located near the end of the hose with the ends of the flexible reinforcing members wholly or partly embedded therein. In the hose illustrated, the metal ring is of triangular cross section and provides a core about which the fabric layer 14 is folded to provide a tapered flange, integral with the hose, by which the hose may be engaged and clamped to another hose section or fitting.

In building the hose (see Figs. 2 and 3) the inner ply 11 of the metallic reinforcing plies is wound upon the fabric layers 14, a mold comprising separable mold members 17, 18 is assembled about the end of the hose, and fused metal is poured through the gate 19 to fill the mold cavity 20 into which the ends of the metallic reinforcements project and provide an anchoring collar 21. The metal flows about the end portions of the reinforcements, entering the meshes and surrounding the elements of the same and locking them in place. To facilitate locking of the reinforcing elements the end portions thereof may be preliminarily tinned and may be bent or kinked so as to hook into the fused metal. When the fused metal, which may be solder, Babbitt metal, lead, tin, type metal, or other alloy having a fusing point below that which would injure the rubber and fabric by being formed thereagainst but above the temperature of steam or other fluid to be conducted by the hose, or to be brought in contact with the hose during vulcanization, is set, the mold is removed from the hose.

The second layer 12 of reinforcing tapes in case such layer is to be added, is laid over the first layer preferably in crossed relation. A second mold consisting of mold parts 22, 23 is now applied over the second reinforcing layer, as shown in Fig. 4, and a second casting is formed over the first. The second casting may be thicker than the first and is preferably of triangular cross section. The molten metal of the second casting fuses the first casting somewhat so as thoroughly to bond them to each other, and the two layers of reinforcing elements become embedded in the casting.

The metallic hose reinforcing members are preferably of foraminous construction such as is provided by the meshes of braided or woven wire or by perforations in metal strips, so that the fusible metal may flow through the apertures and more securely interlock with the metal of the reinforcements.

After removal of the second mold parts 22, 23 the outer layers of fabric and rubber-like material are applied preferably extending over the faces of the metal casting 16 to enclose it as shown, after which the hose is vulcanized.

The flared surface provided by the thickening of the hose wall about the cast reinforcement may be used to engage a clamping ring slipped over the hose to draw the hose into sealed abutment with another hose section or a fitting as disclosed in the Bedur Patent No. 1,939,872 of December 19, 1933.

Variations may be made without departing from the scope of the invention as it is defined by the following claims.

I claim:

1. Hose comprising a tubular wall, an annular body of metal of low fusing point within the wall at an end of the hose and spaced from the bore of the hose by non-metallic material, and flexible reinforcing members of metal extending along the hose within said wall and having a portion thereof at least partially embedded in said body of metal.

2. Hose comprising a tubular wall, a body of metal within said wall at the end of the hose and spaced from the bore of the hose by non-metallic material, and flexible metallic reinforcing elements extending along the wall of the hose and at least partially embedded and anchored in said body of metal.

3. The method of making hose adapted for coupling which comprises partially building the hose wall of longitudinally-extending flexible metallic strip material, clamping the ends of the strip material in place while casting upon said strip material a body of metal to anchor the ends of the strip material, and building additional hose material to completely enclose said body of metal, over the strip material and the body of metal.

4. The method of making hose adapted for coupling which comprises applying a layer comprising a flexible metallic material, casting a body of metal upon a portion of said structure, applying a second layer of metallic material upon the first layer and upon said body, then casting a second body of metal upon the said second layer and over the first body of metal to interlock the said bodies of metal and layers of metallic material.

5. The method of making hose which comprises forming a tubular structure comprising fabric and a composition of rubber-like material, applying a layer of tapes of metallic mesh material thereabout, casting an annular body of metal upon the end portions of the strips, applying a second layer of tapes of metallic mesh material upon the structure and upon said body of metal, and casting a second annular body of metal upon the second layer of tapes and first body of metal and fusing together the bodies of metal and locking the tapes thereto.

6. Hose comprising a tubular body of flexible material, a layer of foraminous metallic material extending along the wall between the inner and outer surfaces thereof, a body of metal of relatively low melting point embedded within the wall of the tubular body and interlocked with said layer through the perforations thereof, and a layer of reinforcing material extending along the wall of said tubular body and enclosing said body of metal.

7. Hose comprising a flexible tubular body and a flared stiff end portion adapted to be clamped for coupling the hose, said body comprising metallic reinforcing elements extending longitudinally of said body and completely embedded within a wall thereof, said end portion comprising an annular body of metal having a bore extending axially of the hose, said annular body being cast upon and anchored to said reinforcing elements and being embedded in the wall of the tubular body, and said body of metal being of increasing size toward the end of the hose.

ANDREW D. MACLACHLAN.

CERTIFICATE OF CORRECTION.

Patent No. 2,241,355. May 6, 1941.

ANDREW D. MACLACHLAN.

It is hereby certified that error appears in the printed specification of the above numbered patent requiring correction as follows: Page 2, first column, lines 42 and 43, claim 3, for "material to completely enclose said body of metal, over the strip material and the body of metal" read --material over the strip material and the body of metal to completely enclose said body of metal--; and that the said Letters Patent should be read with this correction therein that the same may conform to the record of the case in the Patent Office.

Signed and sealed this 15th day of September, A. D. 1942.

(Seal)

Henry Van Arsdale,
Acting Commissioner of Patents.